(12) United States Patent
Ishii et al.

(10) Patent No.: US 11,017,274 B2
(45) Date of Patent: May 25, 2021

(54) INFORMATION PROCESSING SYSTEM AND INFORMATION PROCESSING METHOD

(71) Applicant: Panasonic Intellectual Property Management Co., Ltd., Osaka (JP)

(72) Inventors: Yasunori Ishii, Osaka (JP); Hiroaki Urabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 202 days.

(21) Appl. No.: 16/360,428

(22) Filed: Mar. 21, 2019

(65) Prior Publication Data
US 2019/0303730 A1    Oct. 3, 2019

(30) Foreign Application Priority Data

Mar. 27, 2018  (JP) .............................. JP2018-060087
Nov. 22, 2018  (JP) .............................. JP2018-218862

(51) Int. Cl.
*G06K 9/62*    (2006.01)
*G06K 9/00*    (2006.01)

(52) U.S. Cl.
CPC ....... *G06K 9/6288* (2013.01); *G06K 9/00805* (2013.01); *G06K 9/6215* (2013.01); *G06K 9/6292* (2013.01)

(58) Field of Classification Search
CPC ............. G06K 9/6288; G06K 9/00805; G06K 9/6292; G06K 9/6215; G06K 9/6262; G06K 9/00791
See application file for complete search history.

(56) References Cited

U.S. PATENT DOCUMENTS

2017/0025017 A1*  1/2017  Thomas ................ B60W 30/08
2018/0373992 A1* 12/2018  Yin ........................... G06N 5/04

FOREIGN PATENT DOCUMENTS

EP   3 121 762       1/2017
JP   2017-102838     6/2017

OTHER PUBLICATIONS

Stampfle et al. (hereinafter "Stampfle"), "Performance evaluation of automotive sensor data fusion," 2005, IEEE Intelligent Transportation Systems, Vienna. (Year: 2005).*

(Continued)

*Primary Examiner* — Peter D Nolan
*Assistant Examiner* — Ashley L Redhead, Jr.
(74) *Attorney, Agent, or Firm* — Wenderoth, Lind & Ponack, L.L.P.

(57) ABSTRACT

Provided is an information processing system configured to: obtain a first recognition result of an object based on sensor data from first sensor; obtain a second recognition result of an object based on sensor data from a second sensor different from the first sensor; perform a first determination of determining a degree of similarity between the first and second recognition results; control, in accordance with a result of the first determination, a fusion process of fusing the first and second recognition results; and output at least one of the first recognition result, the second recognition result, and a third recognition result, in accordance with the result of the first determination. The third recognition result is a fusion of the first and second recognition results.

13 Claims, 11 Drawing Sheets

(56) References Cited

OTHER PUBLICATIONS

Aziz, "Fuzzy track-to-track association and track fusion approach in distributed multisensor-multitarget multiple-attribute environment", Jun. 2007, ScienceDirect, Signal Processing, vol. 87, Issue 6 (Year: 2007).*

Extended European Search Report dated Jul. 25, 2019 in corresponding European Patent Application No. 19162724.9.

* cited by examiner

FIG. 4

| RECOGNITION ACCURACY COMBINATIONS | HIGH DEGREE OF SIMILARITY | | LOW DEGREE OF SIMILARITY | |
|---|---|---|---|---|
| | HIGH DEGREE OF SIMILARITY WITH THIRD RECOGNITION RESULT | LOW DEGREE OF SIMILARITY WITH THIRD RECOGNITION RESULT | HIGH DEGREE OF SIMILARITY WITH THIRD RECOGNITION RESULT | LOW DEGREE OF SIMILARITY WITH THIRD RECOGNITION RESULT |
| HIGH/HIGH | FUSION POSSIBLE (INCREASES ACCURACY) | | FUSION POSSIBLE (PERFORMANCE COMPLEMENTATION) | |
| HIGH/LOW | FUSION POSSIBLE (INCREASES ACCURACY) | | FUSION POSSIBLE (PERFORMANCE COMPLEMENTATION) | FUSION NOT POSSIBLE (REDUCES ACCURACY) |
| LOW/LOW | FUSION NOT POSSIBLE (UNDETERMINABLE) | | FUSION NOT POSSIBLE (UNDETERMINABLE) | |

FIG. 7

| RECOGNITION ACCURACY COMBINATIONS | HIGH DEGREE OF SIMILARITY | LOW DEGREE OF SIMILARITY |
|---|---|---|
| HIGH/HIGH | FUSION POSSIBLE (INCREASES ACCURACY) | FUSION POSSIBLE (PERFORMANCE COMPLEMENTATION) |
| HIGH/LOW | FUSION POSSIBLE (INCREASES ACCURACY) | FUSION NOT POSSIBLE (REDUCES ACCURACY) |
| LOW/LOW | FUSION NOT POSSIBLE (UNDETERMINABLE) | FUSION NOT POSSIBLE (UNDETERMINABLE) |

FIG. 10

| RECOGNITION ACCURACY COMBINATIONS | HIGH DEGREE OF SIMILARITY WITH THIRD RECOGNITION RESULT | LOW DEGREE OF SIMILARITY WITH THIRD RECOGNITION RESULT |
|---|---|---|
| HIGH/HIGH | FUSION POSSIBLE (INCREASES ACCURACY) | FUSION POSSIBLE (PERFORMANCE COMPLEMENTATION) |
| HIGH/LOW | FUSION POSSIBLE (INCREASES ACCURACY) | FUSION NOT POSSIBLE (REDUCES ACCURACY) |
| LOW/LOW | FUSION NOT POSSIBLE (UNDETERMINABLE) | FUSION NOT POSSIBLE (UNDETERMINABLE) |

INFORMATION PROCESSING SYSTEM AND INFORMATION PROCESSING METHOD

CROSS REFERENCE TO RELATED APPLICATION

This application claims the benefit of priority of Japanese Patent Application Number 2018-060087 filed on Mar. 27, 2018 and Japanese Patent Application Number 2018-218862 filed on Nov. 22, 2018, the entire contents of which are hereby incorporated by reference.

BACKGROUND

1. Technical Field

The present disclosure relates to an information processing system and an information processing method.

2. Description of the Related Art

Japanese Unexamined Patent Application Publication No. 2017-102838 discloses a system configured to implement object recognition via sensor fusion utilizing output data from first and second sensors.

SUMMARY

However, with the background art, there are instances in which object recognition results obtained via sensor fusion are worse than object recognition results obtained via individual sensors. The present disclosure provides an information processing system and an information processing method capable of inhibiting a degradation of object recognition results caused by fusing the results.

An information processing system according to one aspect of the present disclosure is configured to: obtain a first recognition result which is a recognition result of an object based on sensor data from a first sensor; obtain a second recognition result which is a recognition result of an object based on sensor data from a second sensor different from the first sensor; perform a first determination of determining a degree of similarity between the first recognition result and the second recognition result; control, in accordance with a result of the first determination, a fusion process of fusing the first recognition result and the second recognition result; and output at least one of the first recognition result, the second recognition result, and a third recognition result, in accordance with the result of the first determination. The third recognition result is a fusion of the first recognition result and the second recognition result.

An information processing system according to one aspect of the present disclosure is configured to: obtain a first recognition result which is a recognition results of an object based on sensor data from a first sensor; obtain a second recognition result which is a recognition result of an object based on sensor data from a second sensor different from the first sensor; perform a fusion process of fusing the first recognition result and the second recognition result; perform a second determination of determining a first degree of similarity between a third recognition result and the first recognition result and a second degree of similarity between the third recognition result and the second recognition result, the third recognition result being a fusion of the first recognition result and the second recognition result; and output at least one of the first recognition result, the second recognition result, and the third recognition result, in accordance with a result of the second determination.

These general and specific aspects may be implemented using a method, an integrated circuit, a computer program, or a computer-readable recording medium such as a CD-ROM, or any combination of methods, integrated circuits, computer programs, or computer-readable recording media.

The information processing system and the information processing method according to the present disclosure are capable of inhibiting a degradation of object recognition results caused by fusing the results.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a table illustrating whether or not the third recognition result increases in recognition accuracy in a plurality of cases depending on degree of similarity and recognition accuracy;

FIG. 7 is a table illustrating whether or not the third recognition result improves in performance in a plurality of cases depending on degree of similarity and recognition accuracy;

FIG. 10 is a table illustrating whether or not the third recognition result improves in performance in a plurality of cases depending on degree of similarity and recognition accuracy.

DETAILED DESCRIPTION OF THE EMBODIMENTS

Figure 1:
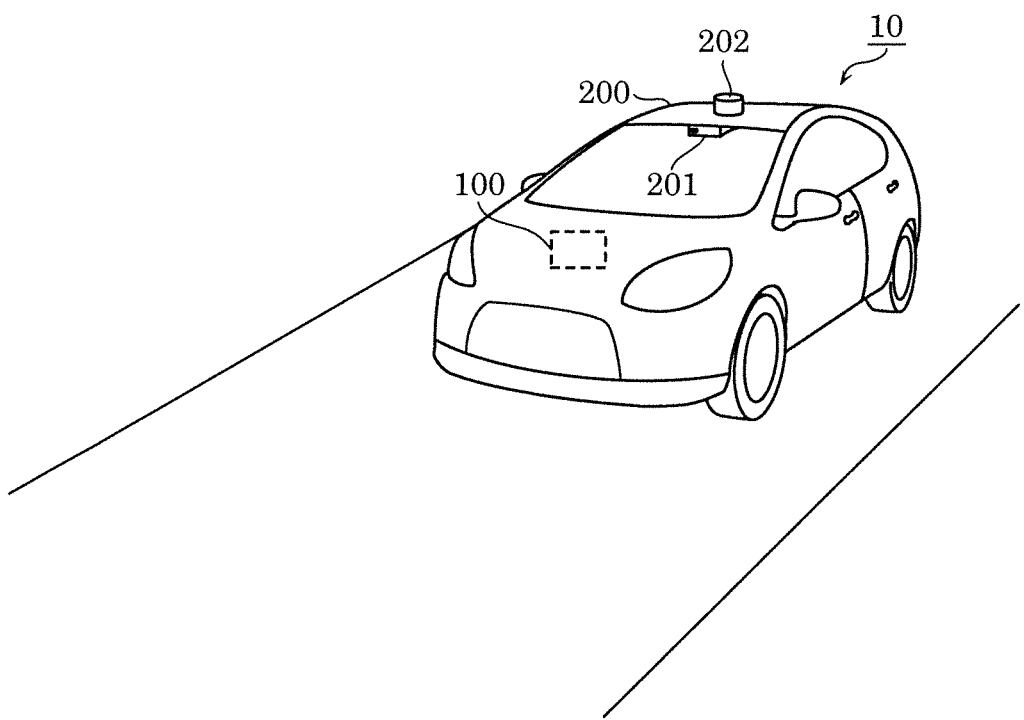
FIG. 1 illustrates an external view of the information processing system according to Embodiment 1.

Underlying Knowledge Forming Basis of Present Invention

The inventors discovered the following problems related to the conventional art described above.

There are instances in which recognition accuracy does not increase even when the object recognition is performed using output data from a first sensor and output data from a second sensor, like with the technique disclosed in Japanese Unexamined Patent Application Publication No. 2017-102838. In such cases, there is concern that a recognition result that is low in accuracy will be output.

When recognition results based on sensor data obtained from a plurality of different types of sensors are fused before being used, if the recognition result corresponding to a first sensor among the plurality of sensors is significantly different from the actual situation, that is to say, if the recognition result corresponding to the first sensor is inaccurate, it may negatively affect the overall recognition result. For example, if the sensor data from the first sensor contains a lot of noise, contains high magnitude noise, or if the first sensor is malfunctioning, it will cause an error of a considerable magnitude in the recognition result corresponding to the first sensor.

Moreover, it is difficult to judge whether the sensor data from first sensor is accurate sensor data or not. For example, when the sensor data is image data, if the image data is captured at night and is grainy, it is difficult to judge based on pixel values whether the image is grainy from image noise or whether the image is grainy because it includes an object having a grainy texture.

In order to achieve the above-described object, an information processing system according to one aspect of the present disclosure includes: a first obtainer that obtains a first recognition result which is a recognition result of an object based on sensor data from a first sensor; a second obtainer that obtains a second recognition result which is a recognition result of an object based on sensor data from a second sensor different from the first sensor; a first determiner that performs a first determination of determining a degree of similarity between the first recognition result and the second recognition result; a fusion controller that controls, in accordance with a result of the first determination, a fusion process of fusing the first recognition result and the second recognition result; and an outputter that outputs at least one of the first recognition result, the second recognition result, and a third recognition result, in accordance with the result of the first determination. The third recognition result is a fusion of the first recognition result and the second recognition result.

With this, the fusion process of fusing the first recognition result and the second recognition result is controlled in accordance with the determination result of the degree of similarity between the first recognition result and the second recognition result, and at least one of the first recognition result, the second recognition result, and the third recognition result obtained as a result of the fusion process is output. Accordingly, it is possible to inhibit a degradation in object recognition results caused by the fusion of recognition results.

Moreover, for example, the first recognition result and the second recognition result may be recognition results of locations of the objects, and the degree of similarity may be a degree of similarity relating to the locations of the objects.

This makes it possible to inhibit a degradation in object recognition results caused by the fusion of recognition results, since at least one of the first recognition result, the second recognition result, and the third recognition result is output in accordance with the determination result of the degree of similarity between the recognized object locations.

Moreover, for example, the first recognition result and the second recognition result may be recognition results of classifications of the objects, and the degree of similarity may be a degree of similarity between the classifications of the objects.

This makes it possible to inhibit a degradation in object recognition results caused by the fusion of recognition results, since at least one of the first recognition result, the second recognition result, and the third recognition result is output in accordance with the determination result of the degree of similarity between the recognized object classifications.

Moreover, for example, the first recognition result and the second recognition result may be detection results of the objects, and the degree of similarity may be a degree of similarity between total numbers of the objects detected.

This makes it possible to inhibit a degradation in object recognition results caused by the fusion of recognition results, since at least one of the first recognition result, the second recognition result, and the third recognition result is output in accordance with the determination result of the degree of similarity between the total numbers of detected objects.

Moreover, the information processing system may further include a third obtainer that obtains first correlation information correlated to a first evaluation value of the first recognition result and second correlation information correlated to a second evaluation value of the second recognition result. The fusion controller may control the fusion process in accordance with the result of the first determination, the first correlation information obtained by the third obtainer, and the second correlation information obtained by the third obtainer.

This makes it possible to perform the fusion process taking the first evaluation value of the first recognition result and the second evaluation value of the second recognition result into consideration, by obtaining the first correlation information and the second correlation information. In other words, it is possible to obtain a beneficial object recognition result by controlling the fusion process in accordance with the determination result of the degree of similarity between the first recognition result and the second recognition result, and the first correlation information and second correlation information.

Moreover, for example, the first correlation information and the second correlation information may each indicate at least one of (i) an environment of a space in which the first sensor and the second sensor are located when the first sensor and the second sensor are performing sensing operations; (ii) states of the first sensor and the second sensor when the first sensor and the second sensor are performing sensing operations; and (iii) specifications of the first sensor and the second sensor.

This makes it possible to easily perform the fusion process taking into account the first evaluation value and the second evaluation value, by obtaining at least one of (i) an environment of a space in which the first sensor and the second sensor are located when the first sensor and the second sensor are performing sensing operations; (ii) states of the first sensor and the second sensor when the first sensor and the second sensor are performing sensing operations; and (iii) specifications of the first sensor and the second sensor.

Moreover, for example, the information processing system may further include a second determiner that performs a second determination of determining a first degree of similarity between the third recognition result and the first recognition result and a second degree of similarity between the third recognition result and the second recognition result. The outputter may output at least one of the first recognition result, the second recognition result, and the third recognition result, in accordance with a result of the second determination.

This makes it possible to obtain a beneficial object recognition result since at least one of the first recognition result, the second recognition result, and the third recognition result is output in accordance with the first degree of similarity and the second degree of similarity.

Moreover, for example, the fusion controller may control the fusion process by controlling whether to execute the fusion process.

With this, whether or not to perform the fusion process is controlled in accordance with the result of the first determination. This makes it possible to prevent, with certainty, a degradation in object recognition results due to the fusion of recognition results by, for example, not performing the fusion process when it is estimated, according to the result of the first determination, that the recognition result would not improve even if the fusion process were performed.

Moreover, for example, the fusion controller may control whether to execute the fusion process by controlling whether to input the first recognition result and the second recognition result into a fusion processor that performs the fusion process.

With this, the input of the first recognition result and the second recognition result into the fusion processor is controlled in accordance with the result of the first determination. Accordingly, it is possible to control whether to perform the fusion process or not, even when it is not possible to directly control the operations of the fusion processor.

Moreover, for example, the fusion controller may control the fusion process by adjusting a parameter of the fusion process.

With this, a parameter of the fusion process is adjusted in accordance with the result of the first determination. Accordingly, for example, when it is estimated, according to the result of the first determination, that the recognition result would not improve even if the fusion process were performed, degradation of the object recognition result due to fusion of the recognition results can be inhibited by reducing a weighting in the fusion process and performing the fusion process.

An information processing system according to one aspect of the present disclosure includes: a first obtainer that obtains a first recognition result which is a recognition results of an object based on sensor data from a first sensor; a second obtainer that obtains a second recognition result which is a recognition result of an object based on sensor data from a second sensor different from the first sensor; a fusion processor that performs a fusion process of fusing the first recognition result and the second recognition result; a second determiner that performs a second determination of determining a first degree of similarity between a third recognition result and the first recognition result and a second degree of similarity between the third recognition result and the second recognition result, the third recognition result being a fusion of the first recognition result and the second recognition result; and an outputter that outputs at least one of the first recognition result, the second recognition result, and the third recognition result, in accordance with a result of the second determination.

This makes it possible to obtain a beneficial object recognition result since at least one of the first recognition result, the second recognition result, and the third recognition result is output in accordance with the first degree of similarity and the second degree of similarity.

Moreover, for example, the information processing system may further include a recognizer that executes a recognition process for recognizing an object based on the sensor data from the first sensor and the sensor data from the second sensor, and outputs the first recognition result and the second recognition result.

With this, so long as sensor data from the first sensor and sensor data from the second sensor is obtained, the first recognition result and the second recognition result can be obtained.

These general and specific aspects may be implemented using a method, an integrated circuit, a computer program, or a computer-readable recording medium such as a CD-ROM, or any combination of methods, integrated circuits, computer programs, or computer-readable recording media.

Hereinafter, the information processing system and the information processing method according to one aspect of the present disclosure will be described in detail with reference to the drawings.

The embodiments described below each show a specific example of the present disclosure. The numerical values, shapes, materials, elements, the arrangement and connection of the elements, steps, order of the steps, etc., indicated in the following embodiments are mere examples, and therefore do not intend to limit the present disclosure. Therefore, among elements in the following embodiments, those not recited in any of the broadest, independent claims are described as optional elements.

Embodiment 1

First, Embodiment 1 will be described with reference to FIG. 1 through FIG. 5.

1-1. Configuration

FIG. 1 illustrates an external view of the information processing system according to Embodiment 1.

Information processing system 10 according to Embodiment 1 is provided in or on vehicle 200. As illustrated in FIG. 1, information processing system 10 includes information processing device 100, first sensor 201, and second sensor 202. In other words, information processing device 100, first sensor 201, and second sensor 202 are provided in or on vehicle 200.

For example, first sensor 201 is an imaging device that captures an area in front of vehicle 200. First sensor 201 is not limited to capturing an area in front of vehicle 200; first sensor 201 may capture any area in the surrounding region of vehicle 200, such as areas to the left, right, and behind vehicle 200. For example, the image data (sensor data) obtained by first sensor 201 is used for recognition of objects in the surrounding area of vehicle 200. For example, the recognition result is used for autonomous or assisted driving of vehicle 200.

Second sensor 202 is a distance sensor that detects the distance to an object in the surrounding area of vehicle 200. For example, distance information indicating the distance detected by second sensor 202 is used for estimating the position of vehicle 200 during autonomous or assisted driving of vehicle 200.

For example, information processing device 100 executes a recognition process on sensor data obtained by first sensor 201 and sensor data obtained by second sensor 202. Then, information processing device 100 outputs a more accurate recognition result using a first recognition result which is a recognition result of an object based on the sensor data obtained by first sensor 201 and a second recognition result which is a recognition result of an object based on the sensor data obtained by second sensor 202.

Next, a specific example of the hardware configuration of information processing system 10 including information processing device 100 will be given with reference to FIG. 2.

Figure 2:
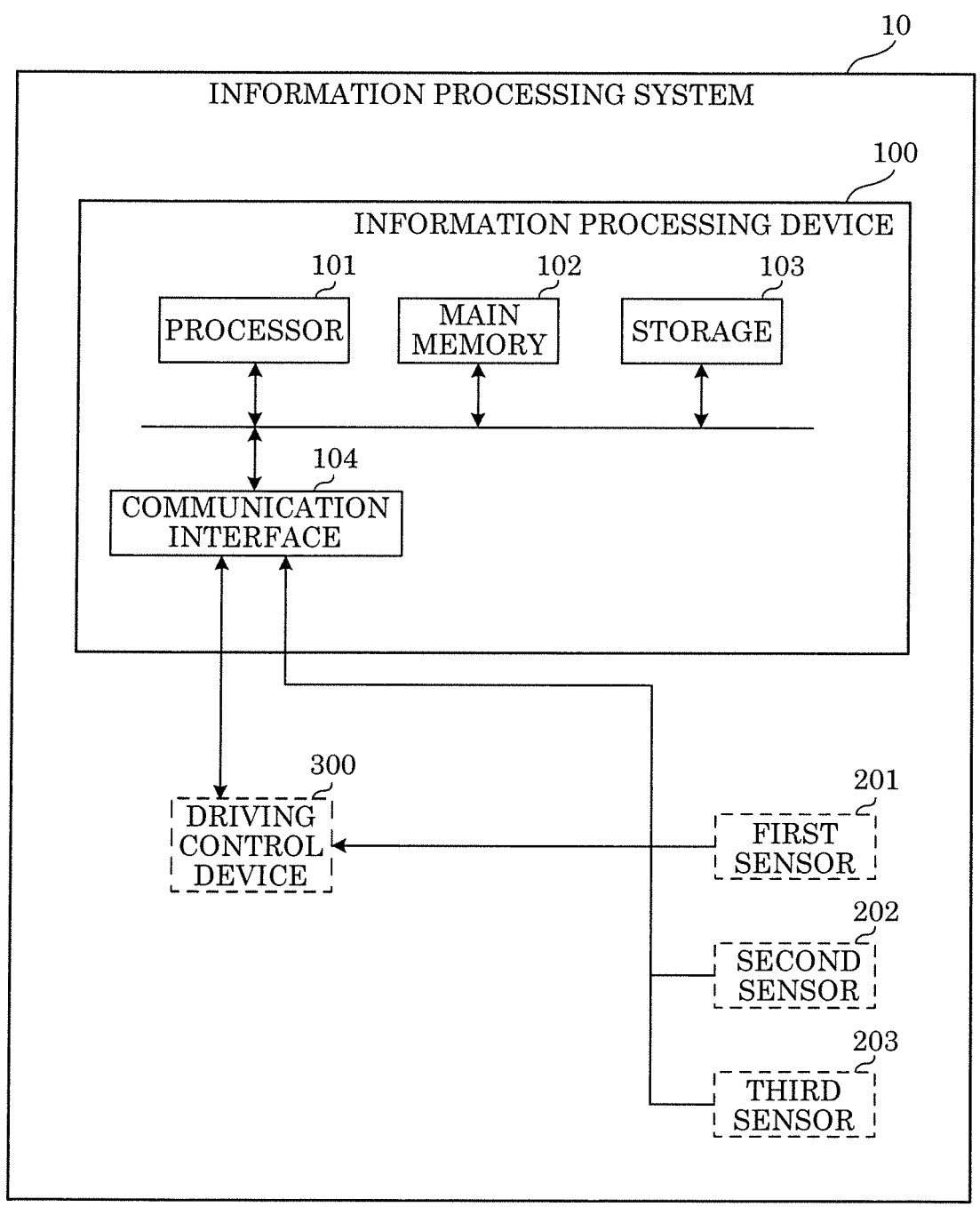
FIG. 2 is a block diagram illustrating one example of the hardware configuration of the information processing system including the information processing device according to Embodiment 1.

FIG. 2 is a block diagram illustrating one example of the hardware configuration of the information processing system including the information processing device according to Embodiment 1.

As illustrated in FIG. 2, information processing system 10 includes, as hardware, information processing device 100, first sensor 201, and second sensor 202. Information processing system 10 may further include third sensor 203 and driving control device 300.

Information processing device 100 includes, as hardware, processor 101, main memory 102, storage 103, and communication interface (IF) 104. Information processing device 100 may be, for example, an electronic control unit (ECU).

Processor 101 executes a control program stored in, for example, storage 103.

Main memory 102 is a volatile storage area used as a work area for when processor 101 executes the control program.

Storage 103 is a non-volatile storage region that stores, for example, the control program and content.

Communication IF 104 communicates with first through third sensors 201 through 203 and driving control device 300 over, for example, a communication network such as a controller area network (CAN). Note that communication IF 104 is not limited to a wired communication interface, and may be a wireless communication interface. Communication IF 104 may be any communication interface that can establish a communication connection with, for example, first through third sensors 201 through 203 and driving control device 300. Communication IF 104 may be a communication interface capable of communicatively connecting to a general-use network, such as the internet, or an exclusive network.

First sensor 201 is an imaging device that includes an optical system, such as a lens, and an image sensor. In other words, first sensor 201 is a camera. First sensor 201 is bilaterally communicatively connectable to information processing device 100. First sensor 201 captures a plurality of images over time, such as at a rate of 60 frames per second (fps), and outputs the captured images as sensor data.

Second sensor 202 is a distance sensor that detects the distance to an object in the surrounding area of vehicle 200. More specifically, second sensor 202 detects distances to objects in azimuth angles of 360 degrees in a horizontal plane relative to vehicle 200 and in a predetermined range (such as 30 degrees) in a vertical plane relative to vehicle 200. For example, distances detected by second sensor 202 are used in the generation of three-dimensional geometry of the terrain including objects in the surrounding area of vehicle 200. For example, second sensor 202 is a laser sensor such as a light detection and ranging (LIDAR) sensor. Second sensor 202 outputs sensor data obtained by performing a plurality of sensing operations over time.

For example, third sensor 203 is disposed in the same space as first sensor 201 and second sensor 202, and detects the illuminance of the space. For example, third sensor 203 may be disposed inside vehicle 200 or on the outside of vehicle 200. Third sensor 203 outputs sensor data obtained by performing a plurality of sensing operations over time.

Driving control device 300 is an information processing device that controls the driving of vehicle 200. For example, driving control device 300 includes a processor, main memory, storage, and a communication IF. Driving control device 300 may be implemented using the same configuration as information processing device 100. In other words, driving control device 300 may be implemented as processor 101, main memory 102, storage 103, and communication IF 104. Moreover, driving control device 300 may be implemented as an ECU, and when information processing device 100 is implemented as an ECU, driving control device 300 may be implemented as the same ECU as information processing device 100, and, alternatively, may be implemented as a different ECU from information processing device 100.

Information processing system 10 may include various sensors in addition to first through third sensors 201 through 203, such as an acceleration sensor that detects the acceleration of vehicle 200 along three axes, and a gyro sensor that detects the turning angle speed of vehicle 200. Information processing system 10 may also include a global navigation satellite system (GNSS) receiver that detects the current position of vehicle 200.

Driving control device 300 is an information processing device that controls the driving of vehicle 200. Specifically, driving control device 300 controls, for example, the steering of the wheels, the engine that drives the wheels, a power source such as a motor, and the brakes for damping of the wheels, for autonomous or assisted driving of vehicle 200. For example, driving control device 300 includes a processor, main memory, storage, and a communication IF. Driving control device 300 may be implemented using the same configuration as information processing device 100. In other words, driving control device 300 may be implemented as processor 101, main memory 102, storage 103, and communication IF 104. Moreover, driving control device 300 may be implemented as an ECU, and when information processing device 100 is implemented as an ECU, driving control device 300 may be implemented as the same ECU as information processing device 100, and, alternatively, may be implemented as a different ECU from information processing device 100.

Next, the functional configuration of information processing system 10 will be described with reference to FIG. 3.

Figure 3:
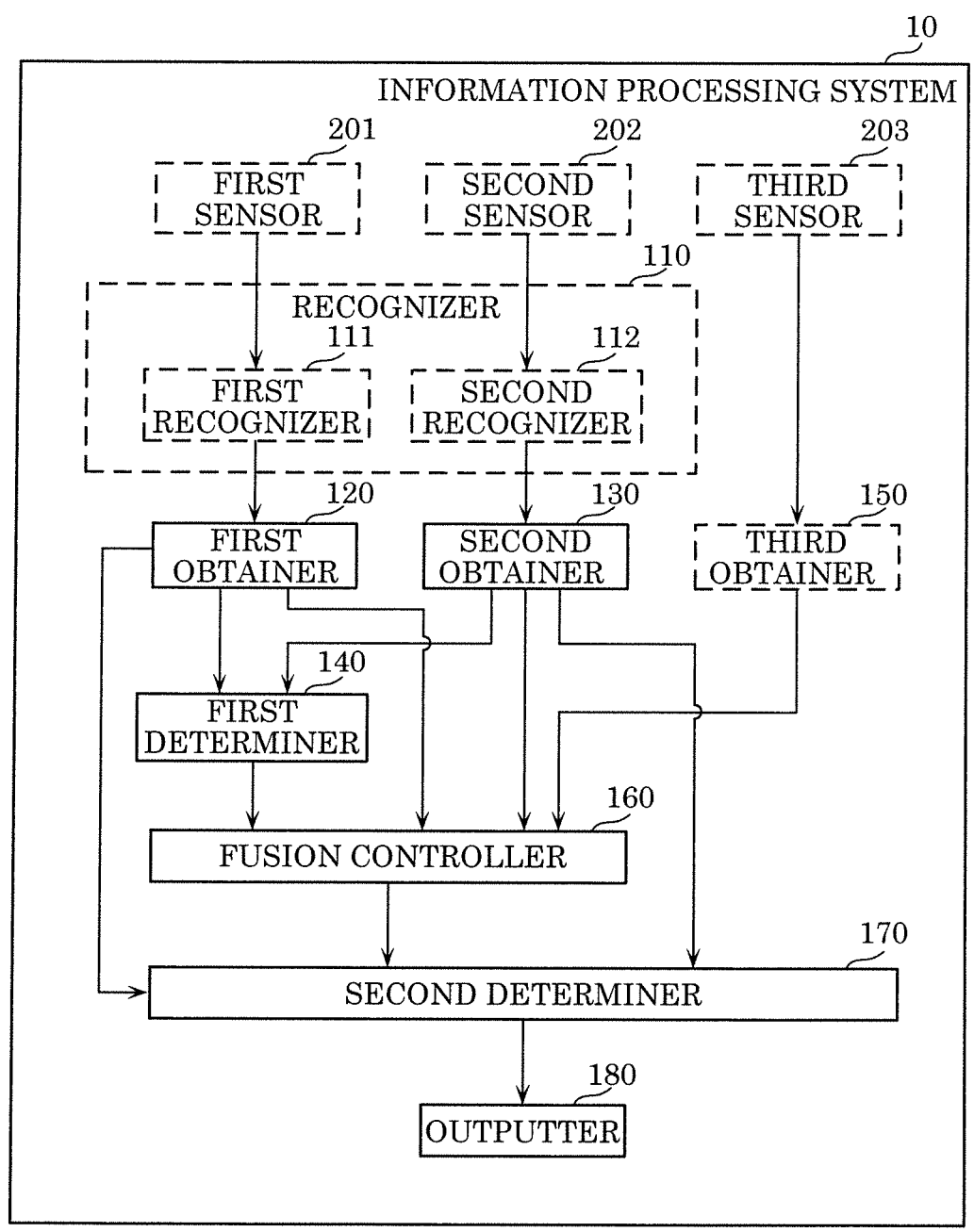
FIG. 3 is a block diagram illustrating one example of the functional configuration of the information processing system according to Embodiment 1.

FIG. 3 is a block diagram illustrating one example of the functional configuration of the information processing system according to Embodiment 1.

Information processing system 10 includes first obtainer 120, second obtainer 130, first determiner 140, fusion controller 160, second determiner 170, and outputter 180. Information processing system 10 may further include first sensor 201, may further include second sensor 202, may further include third sensor 203, may further include recognizer 110, and may further include third obtainer 150. Note that since the configurations of first through third sensors 201 through 203 have already been described above, repeated description is omitted.

Recognizer 110 includes first recognizer 111 and second recognizer 112. First recognizer 111 executes an object recognition process (hereinafter also referred to as simply "recognition process") based on sensor data from first sensor 201, and outputs the result of the recognition process as a first recognition result. Here, object recognition includes a variety of types of recognition related to the object, such as object detection, recognition of the distance to an object, object classification recognition, and object size recognition. First recognizer 111 obtains a plurality of items of sensor data resulting from first sensor 201 performing a plurality of sensing operations over time, and performs a recognition process based on the plurality of items of obtained sensor data. First recognizer 111 may perform the recognition process for each of the plurality of items of sensor data, and, alternatively, may perform the recognition process for each of a plurality of groups of two or more of the plurality of items of sensor data.

Second recognizer 112 executes a recognition process based on sensor data from second sensor 202, and outputs the result of the recognition process as a second recognition result. Second recognizer 112 may obtain a plurality of items of sensor data resulting from second sensor 202 performing a plurality of sensing operations over time, and may perform the recognition process for each of the plurality of items of sensor data, and, alternatively, may perform the recognition process for each of a plurality of groups of two or more of the plurality of items of sensor data.

The recognition process executed by recognizer 110 utilizes, for example, a machine learning model. The first recognition result and the second recognition result are, specifically, object recognition results. Moreover, first recognition result and second recognition result may be object detection results, may be object classification results, and may be recognition of the total number of objects. Recognizer 110 may be implemented by information processing device 100, and, alternatively, may be implemented by an information processing device other than information processing device 100 that is communicatively connectable to information processing device 100.

First obtainer 120 obtains the first recognition result from first recognizer 111. First obtainer 120 is implemented as, for example, processor 101, main memory 102, storage 103, and communication IF 104.

Second obtainer 130 obtains the second recognition result from second recognizer 112. Second obtainer 130 is implemented as, for example, processor 101, main memory 102, storage 103, and communication IF 104.

First determiner 140 performs a first determination for determining a degree of similarity between the first recognition result and the second recognition result. The first recognition result and the second recognition result used in the first determination by first determiner 140 are, for example, based on sensor data obtained by performing sensing operations in a single space for both first sensor 201 and second sensor 202 or a space including a region in which the space for first sensor 201 and the space for second sensor 202 overlap. In other words, sensor data on which the first recognition result used in the first determination is based and sensor data on which the second recognition result used in the first determination is based are, for example, data obtained as a result of first sensor 201 and second sensor 202 simultaneously performing sensing operations. Note that, as used herein, the term "simultaneous" includes slight differences in timing to an extent that can be considered to be simultaneous. First determiner 140 is implemented as, for example, processor 101, main memory 102, and storage 103.

Note that since there is no change in the space in which first sensor 201 and second sensor 202 are performing their sensing operations when vehicle 200 is not moving, a first recognition result and a second recognition result based on the two items of sensor data obtained simultaneously by first sensor 201 and second sensor 202 need not be used for the first determination. In other words, in such a situation, a first recognition result and a second recognition result based on the two items of sensor data obtained at different times by first sensor 201 and second sensor 202 may be used for the first determination.

A first example of the degree of similarity is a degree of similarity related to the locations of objects recognized, more specifically, the degree of similarity between locations of objects recognized, the degree of similarity between distances to objects recognized by first sensor 201 and second sensor 202, or the amount of change per unit time in locations of objects recognized. Note that the amount of change per unit time in locations of objects recognized refers to the traveling speed of objects recognized. If the difference between the average or mean of positions of objects recognized in the first and second recognition results and the recognized positions is less than a predetermined threshold, first determiner 140 may determine the degree of similarity to be high, and if greater than or equal to the predetermined threshold, may determine the degree of similarity to be low. Similarly, first determiner 140 may determine whether the degree of similarity is high or low based on whether the difference between the average or mean of distances to the objects and each of the recognized distances to the object, or the difference between the average or mean of amounts of change per unit time and each of the recognized amounts of change per unit time is less than a predetermined threshold or not.

A second example of the degree of similarity is a degree of similarity between classifications of objects recognized, more specifically, a degree of similarity between the types, colors, sizes, and/or shapes of objects recognized. For example, first determiner 140 may determine the degree of similarity to be high when the type of object recognized in the first recognition result and the type of object recognized in the second recognition result belong to the same one of a plurality of predetermined classifications, and may determine the degree of similarity to be low when the types of objects belong to different classifications. Similarly, for object color and shape as well, first determiner 140 may determine whether the degree of similarity is high or low based on whether the colors or shapes belong to the same one of a plurality of predetermined classifications. Moreover, first determiner 140 may determine whether the degree of similarity is high or low based on whether the difference between the average or mean of object colors converted into numerical values in a given index and each of the recognized colors expressed as numerical values in the index, or the difference between the average or mean of sizes and each of the recognized sizes is less than a predetermined threshold or not.

A third example of the degree of similarity is a degree of similarity between the total numbers of objects recognized. In other words, the degree of similarity between the total numbers of objects recognized is the degree of similarity between the total number of objects recognized in the space in which the sensing operation of first sensor 201 is performed and the total number of objects recognized in the space in which the sensing operation of second sensor 202 is performed. For example, first determiner 140 may determine the degree of similarity to be high if the difference between the average or mean of the total numbers of objects recognized in the first and second recognition results and each of the total numbers of objects recognized is lower than a predetermined threshold, and determine the degree of similarity to be low if the difference is greater than or equal to the predetermined threshold.

Note that the predetermined threshold may be set differently for each of the degrees of similarities.

Third obtainer 150 obtains first correlation information correlated to a first evaluation value of the first recognition result and second correlation information correlated to a second evaluation value of the second recognition result. Third obtainer 150 may obtain the first correlation information and the second correlation information from third sensor 203, and may obtain the first correlation information and the second correlation information from an external device not illustrated in the drawings.

As used herein, the first evaluation value and the second evaluation value each indicate, for example, an accuracy rate, a precision ratio, a recall ratio, an F value, an error value, or an inaccuracy rate. Hereinafter, an evaluation value including the first evaluation value and the second evaluation value is also referred to as recognition accuracy. The first correlation information and the second correlation information each indicate at least one of: (i) an environment of a space in which first sensor 201 and second sensor 202 are located when first sensor 201 and second sensor 202 are performing sensing operations; (ii) states of first sensor 201 and second sensor 202 when first sensor 201 and second sensor 202 are performing sensing operations; and (iii) specifications of first sensor 201 and second sensor 202.

The environment of the space relates to, for example, the illuminance of the space. The illuminance of the space may be detected by third sensor 203, may be predicted based on weather information obtained from an external device, and may be predicted based on the current time of day. If the illuminance of the space is lower than a first illuminance, images captured by a camera, which is one example of first sensor 201, tend to include a lot of pixels with pixel values less than or equal to the noise level of the image sensor in the camera, so it is difficult to accurately recognize an object from these images. On the other hand, if the illuminance of the space is higher than a second illuminance, which is higher than the first illuminance, images captured by the camera tend to include a lot of pixels with pixel values that exceed the maximum value capturable by the image sensor, so it is difficult to accurately recognize an object from these images. In this way, there is a correlative relationship between the illuminance of the space and the recognition process evaluation value that utilizes images obtained from the camera as sensor data. Accordingly, the illuminance of the space may be used to determine whether the accuracy of the first recognition result is high or low.

Moreover, the illuminance of the space may affect the distance sensor, which is one example of second sensor 202. For example, when direct sunlight or reflected sunlight is incident on the distance sensor, that is to say, when illuminance higher than a third illuminance is detected in the surrounding area of the distance sensor, it is difficult to accurately recognize objects from the sensor data obtained from the distance sensor. Accordingly, the illuminance of the space may be used to determine whether the accuracy of the second recognition result is high or low.

The states of the first sensor 201 and the second sensor 202 refer to, for example, how dirty the transmitters or receivers of the sensors are or whether the sensors are faulty or not. Here, the transmitter is, in the case of the distance sensor, the component that emits or transmits, for example, light, such as a laser, radio waves, or sound waves. The receiver is, in the case of the camera, the light receiver of the camera, and in the case of the distance sensor, is the component that receives back the emitted or transmitted light, radio waves, or sound waves. When the state of the first sensor 201 or the second sensor 202 indicates that the transmitter or receiver is dirty, the accuracy of the recognition result obtained from the sensor data from the sensor corresponding to the dirty transmitter or receiver can be estimated to be low.

Moreover, although not illustrated in the drawings, third obtainer 150 may obtain, from first sensor 201, a value based on the sensor data from first sensor 201, as the first correlation information.

In such cases, for example, the first correlation information indicates a variance in all pixel values in an image captured by the camera. When the variance in the pixel values in an image is greater than a first variance, it is possible to estimate that there is a lot of noise in the image, so it is difficult to accurately recognize objects from that image. On the other hand, when the variance in pixel values in the image is smaller than a second variance, which is smaller than the first variance, it is possible to estimate that an edge cannot be detected, that pixel values are too low because it is too dark, and/or that pixel values are uniform because fog or rain is captured, so it is difficult to accurately recognize objects from that image. In this way, there is a correlative relationship between the variance in pixel values in an image and the recognition process evaluation value that utilizes images obtained from the camera as sensor data. Accordingly, the variance in pixel values in an image may be used to determine whether the accuracy of the first recognition result is high or low.

The specifications of first sensor 201 and second sensor 202 are specifications indicating the performance capabilities of first sensor 201 and second sensor 202.

Third obtainer 150 is implemented as, for example, processor 101, main memory 102, storage 103, and communication IF 104.

Fusion controller 160 controls the fusion process in accordance with the result of the first determination, and the obtained first and second correlation information. More specifically, fusion controller 160 controls the fusion process by performing any one of: (1) fusing the first recognition result and the second recognition result; (2) not fusing the first recognition result and the second recognition result; and (3) adjusting a parameter for fusing the first recognition result and the second recognition result. Note that this parameter is a weight used in the fusion of the first recognition result and the second recognition result.

Fusion controller 160 fuses the first recognition result and the second recognition result when the accuracy of at least one of the first recognition result and the second recognition result is estimated to be high in accordance with the first correlation information and the second correlation information. For example, fusion controller 160 inputs the first recognition result and the second recognition result into a fusion module, and obtains the third recognition result as an output. Fusion controller 160 does not fuse the first recognition result and the second recognition result when the accuracies of the first recognition result and the second recognition result are estimated to be low in accordance with the first correlation information and the second correlation information. For example, fusion controller 160 does not input the first recognition result and the second recognition result into the fusion module. Note that when the accuracy of one of the first recognition result and the second recognition result is estimated to be low in accordance with the first correlation information and the second correlation information, fusion controller 160 may set the weighting for the recognition result estimated to be low in accuracy lower than the weighting for the recognition result estimated to be high in accuracy, and perform the fusion.

Fusion controller 160 outputs the third recognition result obtained by fusing the first recognition result and the second recognition result. Fusion controller 160 is implemented as, for example, processor 101, main memory 102, and storage 103. Note that fusion controller 160 may implement the fusion process itself, and, alternatively, may cause a fusion module that implements the fusion process to implement the fusion process. Fusion module may be included in fusion controller 160, and, alternatively, may be provided external to fusion controller 160.

Next, the types of situations that cause the third recognition result produced by fusion controller 160 to increase recognition accuracy over the first recognition result or the second recognition result will be considered with reference to FIG. 4.

FIG. 4 is a table illustrating whether or not the third recognition result increases in recognition accuracy in a plurality of cases depending on degree of similarity and recognition accuracy. FIG. 4 divides the results based on whether the degree of similarity between the first recognition result and the second recognition result is high or low, whether both of the degree of similarities between each of the first and second recognition results and the third recognition result are high or not, whether the recognition accuracy of the first recognition result is high or low, and whether the recognition accuracy of the second recognition result is high or low.

The recognition accuracy combinations illustrated in FIG. 4 indicate combinations of first recognition result and second recognition result accuracies. Here, "high/high" indicates that both the accuracies of the first recognition result and the second recognition result are high, "high/low" indicates that the accuracy of one of the first recognition result and the second recognition result is high and the other is low, and "low/low" indicates that the accuracies of the first recognition result and the second recognition result could not be determined. Moreover, "high degree of similarity" in FIG. 4 indicates that the degree of similarity between first recognition result and second recognition result is high, and "low degree of similarity" indicates that the degree of similarity between first recognition result and second recognition result is low. "High degree of similarity with third recognition result" under "high degree of similarity" indicates that the two degrees of similarities between each of the first and second recognition results and the third recognition result are high, and "low degree of similarity with third recognition result" under "high degree of similarity" indicates that at least one of the two degrees of similarities between each of the first and second recognition results and the third recognition result is low. Similarly, "high degree of similarity with third recognition result" under "low degree of similarity" indicates that the two degrees of similarities between each of the first and second recognition results and the third recognition result are high, and "low degree of similarity with third recognition result" under "low degree of similarity" indicates the two degrees of similarities between each of the first and second recognition results and the third recognition result are low. Note that the "two degrees of similarities" refers to the first and second degrees of similarities, which will be described later.

As illustrated in FIG. 4, when the recognition accuracy combination is "high/high", regardless of whether the degree of similarity is high or low, the accuracy of the third recognition result increases. For example, when the recognition accuracy combination is "high/high" and there is a "high degree of similarity", since the accuracies of both the first recognition result and the second recognition result are high, and the degree of similarity between the recognition results is high, this indicates that the accuracies of similar recognition results are both high. Accordingly, such cases contribute to an increase in accuracy of the recognition results. When the recognition accuracy combination is "high/high" and there is a "low degree of similarity", since the accuracies of both the first recognition result and the second recognition result are high, and the degree of similarity between the recognition results is low, this indicates that the accuracies of recognition results of dissimilar, i.e., different object are both high. Accordingly, in such cases, the recognition results produce a more complete result when combined, and contribute to an increase in accuracy.

At the other extreme, when the recognition accuracy combination is "low/low", regardless of whether the degree of similarity is high or low, the accuracy of the third recognition result increases and decreases. This is due to the combined results not necessarily contributing to an increase in accuracy or a more complete result in terms of performance, since the accuracies of both the first recognition result and the second recognition result are low when the recognition accuracy combination is "low/low".

When the recognition accuracy combination is "high/low", the accuracy of the third recognition result increases in the case of a "high degree of similarity", but the accuracy of the third recognition result either increases or reduces depending on whether the degree of similarity with the third recognition result is high or low in the case of a "low degree of similarity". More specifically, when the recognition accuracy combination is "high/low", even if the degree of similarity between the first recognition result and the second recognition result is low, if the degree of similarity with the third recognition result, which results from fusion process, is high, there is little variance between the results of the fusion process, which can be understood to mean that the fusion process was executed effectively. Accordingly, in such cases, the recognition results produce a more complete result when combined, and contribute to an increase in performance. On the other hand, if the degree of similarity with the third recognition result, which results from fusion process, is low, there is a lot of variance between the results of the fusion process, which can be understood to mean that the fusion process was not executed effectively. Accordingly, in such cases, the fusion process reduces accuracy.

In this way, depending on the combination of recognition accuracies of the first recognition result and the second recognition result, the degree of similarity between the first recognition result and the second recognition result, and the degree of similarity between each of the first and second object recognition results with the third recognition result, the fusion can be classified into two categories: one where fusion is effective in improving either the accuracy or performance of the third recognition result, which is the fusion result, and one where fusion reduces accuracy or performance. Accordingly, by referring to the cases illustrated in FIG. 4, the fusion process can be performed more effectively, and the output of recognition results low in accuracy or performance can be reduced.

Second determiner 170 performs a second determination for determining a first degree of similarity and a second degree of similarity between each of the first and second recognition results and the third recognition result. In other words, in performing the second determination, second determiner 170 determines the first degree of similarity, which is a degree of similarity between the third recognition result and the first recognition result, and the second degree of similarity, which is a degree of similarity between the third recognition result and the second recognition result. Second determiner 170 is implemented as, for example, processor 101, main memory 102, and storage 103.

Outputter 180 outputs at least one of the first recognition result, the second recognition result, and the third recognition result, in accordance with a result of the second determination. When the accuracies of the first recognition result and the second recognition result are estimated to be high in accordance with the first correlation information and the second correlation information, outputter 180 may output at least the third recognition result among the first recognition result, the second recognition result, and the third recognition result.

When one of the accuracies of the first recognition result and the second recognition result is estimated to be high in accordance with the first correlation information and the second correlation information, and the degree of similarity between the first recognition result and the second recognition result is high, outputter 180 may output at least the third recognition result among the first recognition result, the second recognition result, and the third recognition result. When one of the accuracies of the first recognition result and the second recognition result is estimated to be high in accordance with the first correlation information and the second correlation information, and the degree of similarity between the first recognition result and the second recognition result is low, and moreover both of the degrees of similarity between the third recognition result and each of the first and second recognition results are high, outputter 180 may output at least the third recognition result among the first recognition result, the second recognition result, and the third recognition result. When one of the accuracies of the first recognition result and the second recognition result is estimated to be high in accordance with the first correlation information and the second correlation information, and the degree of similarity between the first recognition result and the second recognition result is low, and moreover at least one of the two degrees of similarity between the third recognition result and each of the first and second recognition results is low, outputter 180 need not output the third recognition result. Note that when at least the third recognition result among the first recognition result, the second recognition result, and the third recognition result is output when one of the accuracies of the first recognition result and the second recognition result is estimated to be high in accordance with the first correlation information and the second correlation information, a recognition result estimated to be high in accuracy among the first recognition result and the second recognition result may also be output by outputter 180 along with the third recognition result.

When one of the accuracies of the first recognition result and the second recognition result is estimated to be low in accordance with the first correlation information and the second correlation information, outputter 180 may output at least one of the first recognition result and the second recognition result.

Outputter 180 is implemented as, for example, processor 101, main memory 102, storage 103, and communication IF 104.

1-2. Operations

Next, operations performed by information processing system 10 according to Embodiment 1 will be described.

Figure 5:
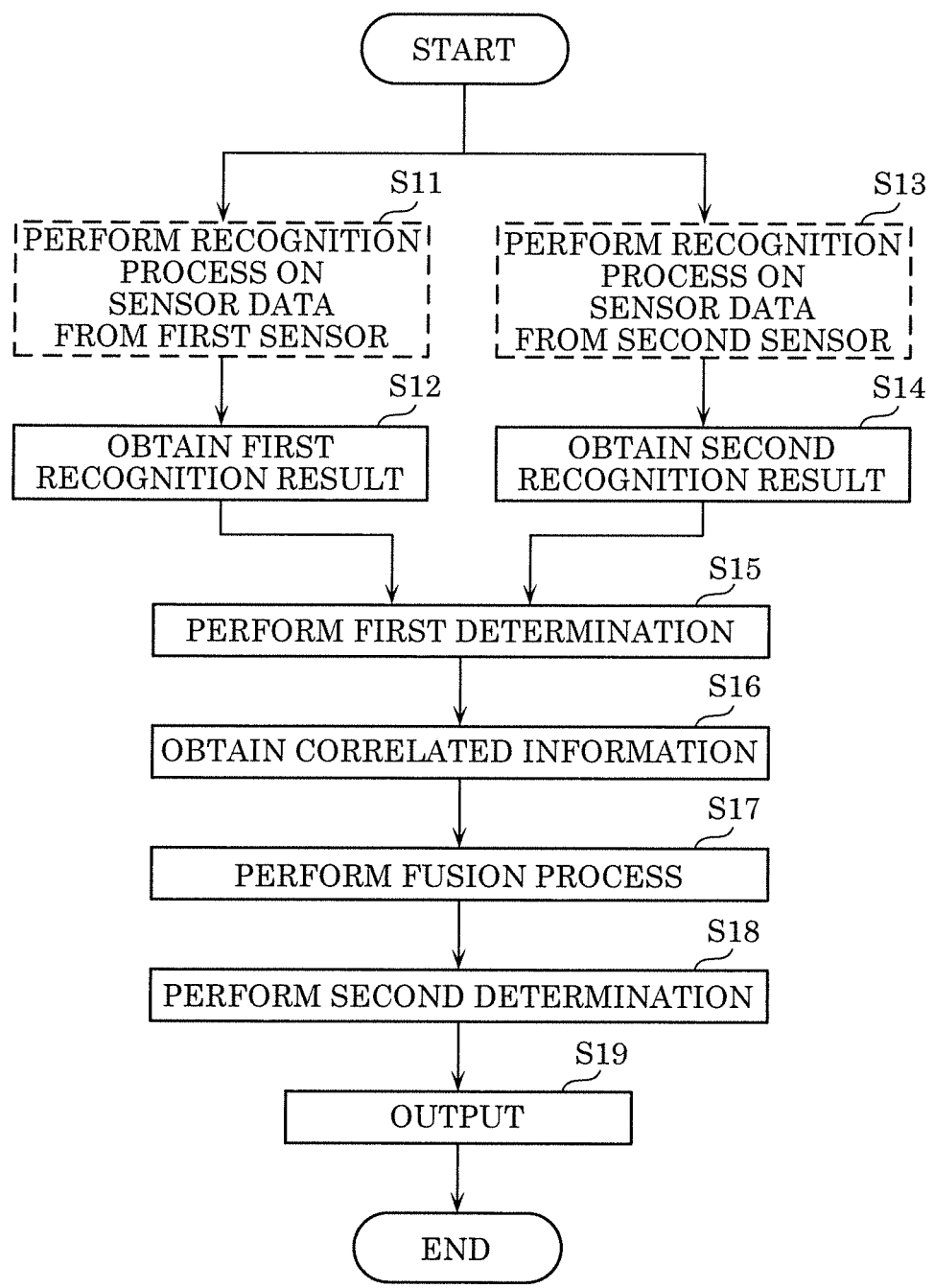
FIG. 5 is a flow chart illustrating one example of an information processing method performed in the information processing system according to Embodiment 1.

FIG. 5 is a flow chart illustrating one example of an information processing method performed in the information processing system according to Embodiment 1.

First, in information processing system 10, first recognizer 111 in recognizer 110 executes a recognition process based on sensor data from first sensor 201, and outputs the result of the recognition process as a first recognition result (S11).

First obtainer 120 obtains the first recognition result from first recognizer 111 (S12).

Second recognizer 112 in recognizer 110 executes a recognition process based on sensor data from second sensor 202, and outputs the result of the recognition process as a second recognition result (S13).

Second obtainer 130 then obtains the second recognition result from second recognizer 112 (S14).

One of the groups of (i) steps S11 and S12 and (ii) steps S13 and S14 is executed regardless of whether the other is being executed or not.

Next, first determiner 140 performs the first determination of determining the degree of similarity between the first recognition result and the second recognition result (S15).

Third obtainer 150 obtains the first correlation information and the second correlation information (S16). Note that step S16 is not limited to being performed after step S15; it is sufficient if step S16 is performed before step S17.

Fusion controller 160 controls the fusion process in accordance with the result of the first determination, and the first and second correlation information (S17).

Second determiner 170 performs a second determination of determining a first degree of similarity and a second degree of similarity between each of the first and second recognition results and the third recognition result (S18).

Outputter 180 outputs at least one of the first recognition result, the second recognition result, and the third recognition result, in accordance with a result of the second determination (S19).

1-3. Advantageous Effects, Etc.

With information processing system 10 according to the present embodiment, the fusion process of fusing the first recognition result and the second recognition result is controlled in accordance with the determination result of the degree of similarity between the first recognition result and the second recognition result, and at least one of the first recognition result, the second recognition result, and the third recognition result obtained as a result of the fusion process is output. Accordingly, it is possible to reduce the probability of an output of a recognition result that is low in accuracy.

Moreover, in the information processing system 10, the first recognition result and the second recognition result are object recognition results, and the degree of similarity is a degree of similarity related to object location. In other words, information processing system 10 outputs at least one of the first recognition result, the second recognition result, and the third recognition result, in accordance with the determination result of the degree of similarity between the recognized object locations. Accordingly, it is possible to inhibit a degradation in object recognition results caused by the fusion of recognition results.

Moreover, in the information processing system 10, the first recognition result and the second recognition result are object recognition results, and the degree of similarity is a degree of similarity between object classifications. In other words, information processing system 10 outputs at least one of the first recognition result, the second recognition result, and the third recognition result, in accordance with the determination result of the degree of similarity between the recognized object classifications. Accordingly, it is possible to inhibit a degradation in object recognition results caused by recognition results.

Moreover, in the information processing system 10, the first recognition result and the second recognition result are object recognition results, and the degree of similarity is a degree of similarity between the total numbers of detected objects. In other words, information processing system 10 outputs at least one of the first recognition result, the second recognition result, and the third recognition result, in accordance with the determination result of the degree of similarity between the total numbers of detected objects. Accordingly, it is possible to inhibit a degradation in object recognition results.

Moreover, by obtaining the first correlation information and the second correlation information, information processing system 10 performs the fusion process taking the first evaluation value of the first recognition result and the second evaluation value of the second recognition result into consideration. In other words, information processing system 10 can obtain a beneficial object recognition result by controlling the fusion process in accordance with the determination result of the degree of similarity between the first recognition result and the second recognition result, and the first correlation information and second correlation information.

Since information processing system 10 obtains at least one of: (i) the environment of the space in which first sensor 201 and second sensor 202 are disposed when first sensor 201 and second sensor 202 are performing sensing operations; (ii) states of first sensor 201 and second sensor 202 when first sensor 201 and second sensor 202 are performing sensing operations; and (iii) specifications of first sensor 201 and second sensor 202, information processing system 10 can easily perform the fusion process taking into account the first evaluation value and the second evaluation value.

Moreover, information processing system 10 performs the second determination that determines the first degree of similarity and the second degree of similarity between the third recognition result and each of the first and second recognition results, and outputs at least one of the first recognition result, the second recognition result, and the third recognition result, in accordance with a result of the second determination. Accordingly, it is possible to obtain a beneficial object recognition result.

Moreover, as control of the fusion process, information processing system 10 performs one of: performing the fusion process, not performing the fusion process, and adjusting a parameter of the fusion process. Accordingly, for example, when it is estimated, according to the result of the first determination, that the recognition result would not improve even if the fusion process were performed, degradation of the object recognition result due to fusion of the recognition results can be inhibited by not performing the fusion process or adjusting a parameter of the fusion process.

Moreover, information processing system 10 performs a recognition process based on the sensor data from first sensor 201 and the sensor data from second sensor 202, and outputs the first recognition result and the second recognition result. Accordingly, so long as information processing system 10 obtains the sensor data from first sensor 201 and the sensor data from second sensor 202, the first recognition result and the second recognition result can be obtained.

1-4. Variations 1-4-1. Variation 1

In Embodiment 1 described above, the first correlation information and the second correlation information are obtained to estimate the accuracy of the first recognition result based on sensor data from first sensor 201 and the accuracy of the second recognition result based on sensor data from second sensor 202, but this example is not limiting. For example, recognizer 110 obtains a plurality of items of sensor data generated by first sensor 201 and second sensor 202 performing a plurality of sensing operations over time, and performs a recognition process for each of the plurality of obtained items of sensor data to obtain a plurality of first recognition results and a plurality of second recognition results. Accordingly, recognizer 110 may compare the current first recognition result with a first recognition result based on previous sensor data, calculate a difference between the two results, and, if the difference is greater than a predetermined threshold, estimate that the recognition accuracy of the current first recognition result is low. Similarly, recognizer 110 may compare the current second recognition result with a second recognition result based on previous sensor data, calculate a difference between the two results, and, if the difference is greater than a predetermined threshold, estimate that the recognition accuracy of the current second recognition result is low. In such cases, fusion controller 160 may obtain the accuracies of the first recognition result and the second recognition result from recognizer 110, and control the fusion process in accordance with the obtained accuracies of the first recognition result and the second recognition result.

Moreover, for example, recognizer 110 may compare simultaneous localization and mapping (SLAM) data generated based on sensor data from second sensor 202 and an advanced driver-assistance systems (ADAS) map either stored in advance or obtained from an external device in advance, and if the shape of the generated SLAM data is substantially different from the shape of the ADAS map, recognizer 110 may estimate that the accuracy of the second recognition result is low.

1-4-2. Variation 2

With information processing system 10 according to Embodiment 1 described above, second determiner 170 is exemplified as, but not limited to, being executed after the fusion process. For example, when the accuracy of one of the first recognition result and the second recognition result is estimated to be high in accordance with the first correlation information and the second correlation information, second determiner 170 may perform the second determination only in cases in which the degree of similarity between the first recognition result and the second recognition result is low.

Embodiment 2

Next, Embodiment 2 will be described.

Figure 6:
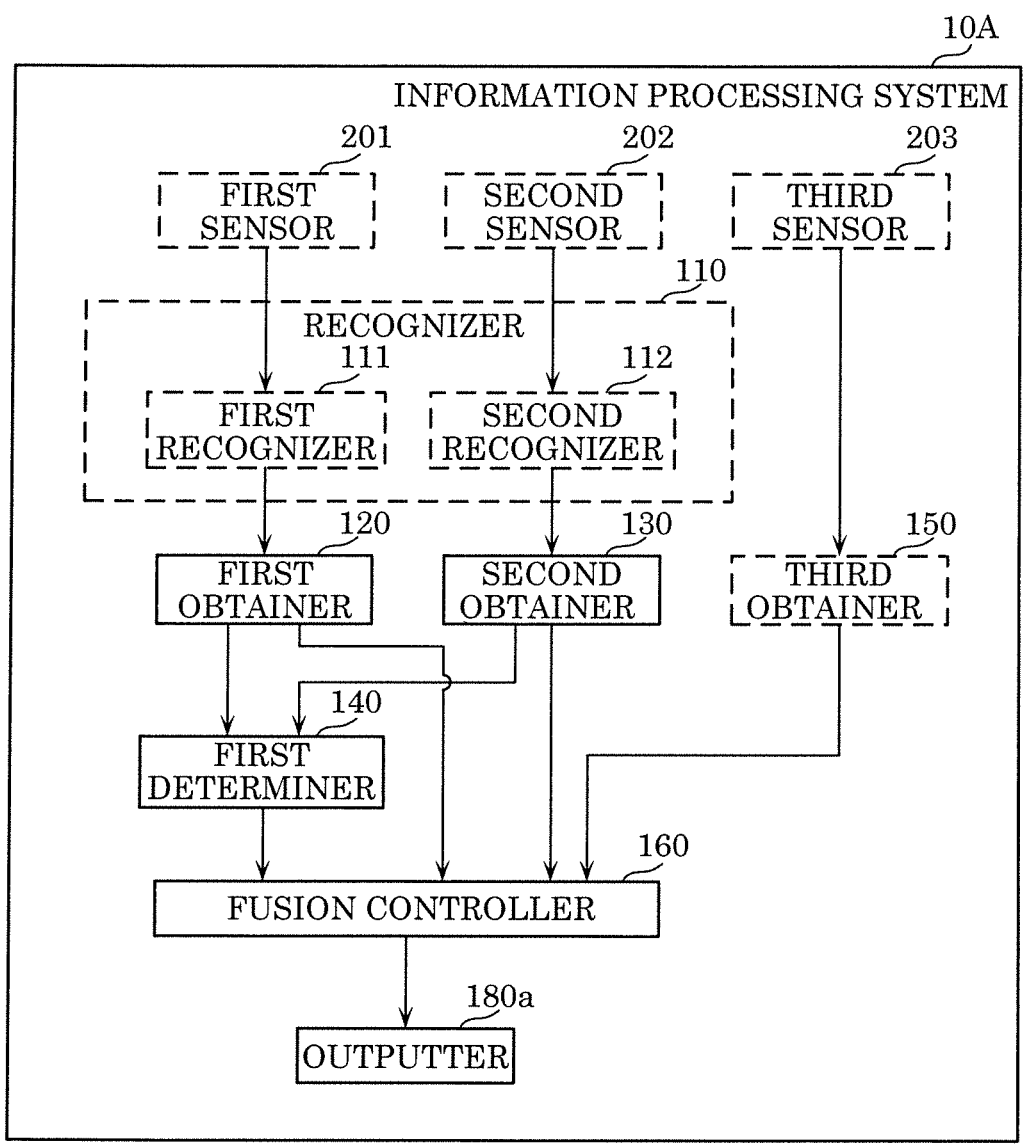
FIG. 6 is a block diagram illustrating one example of the functional configuration of the information processing system according to Embodiment 2.

FIG. 6 is a block diagram illustrating one example of the functional configuration of the information processing system according to Embodiment 2.

Information processing system 10A differs from information processing system 10 according to Embodiment 1 in that it does not include second determiner 170, and the function of outputter 180a is different. Other configurations in information processing system 10A are the same as information processing system 10 according to Embodiment 1. Accordingly, repeated description thereof will be omitted.

Outputter 180a outputs at least one of the first recognition result, the second recognition result, and the third recognition result, in accordance with the first correlation information and the second correlation information. When the accuracies of the first recognition result and the second recognition result are estimated to be high in accordance with the first correlation information and the second correlation information, outputter 180a may output at least the third recognition result among the first recognition result, the second recognition result, and the third recognition result.

When one of the accuracies of the first recognition result and the second recognition result is estimated to be high in accordance with the first correlation information and the second correlation information, and the degree of similarity between the first recognition result and the second recognition result is high, outputter 180a may output at least the third recognition result among the first recognition result, the second recognition result, and the third recognition result. When one of the accuracies of the first recognition result and the second recognition result is estimated to be high in accordance with the first correlation information and the second correlation information, and the degree of similarity between the first recognition result and the second recognition result is low, outputter 180a need not output the third recognition result. Note that when at least the third recognition result among the first recognition result, the second recognition result, and the third recognition result is output when one of the accuracies of the first recognition result and the second recognition result is estimated to be high in accordance with the first correlation information and the second correlation information, outputter 180a may output a recognition result estimated to be high in accuracy among the first recognition result and the second recognition result along with the third recognition result.

When one of the accuracies of the first recognition result and the second recognition result is estimated to be low in accordance with the first correlation information and the second correlation information, outputter 180a may output at least one of the first recognition result and the second recognition result.

FIG. 7 is a table illustrating whether or not the third recognition result improves in performance in a plurality of cases depending on degree of similarity and recognition accuracy. FIG. 7 divides the results based on whether the degree of similarity between the first recognition result and the second recognition result is high or low, whether the recognition accuracy of the first recognition result is high or low, and whether the recognition accuracy of the second recognition result is high or low. In Embodiment 2, since the second determination is not performed, in FIG. 7, whether the degree of similarity between the first recognition result and the third recognition result is high or low and whether the degree of similarity between the second recognition result and the third recognition result is high or low, as illustrated in FIG. 4, are not taken into consideration.

Accordingly, in the cases illustrated in FIG. 7, when the recognition accuracy combination is "high/low", under "high degree of similarity", the performance of the third recognition result increases, but under "low degree of similarity", the performance of the third recognition result decreases. In cases in which the recognition accuracy is "high/high" and "low/low", the results are the same as illustrated in FIG. 4, so repeated description will be omitted.

Figure 8:
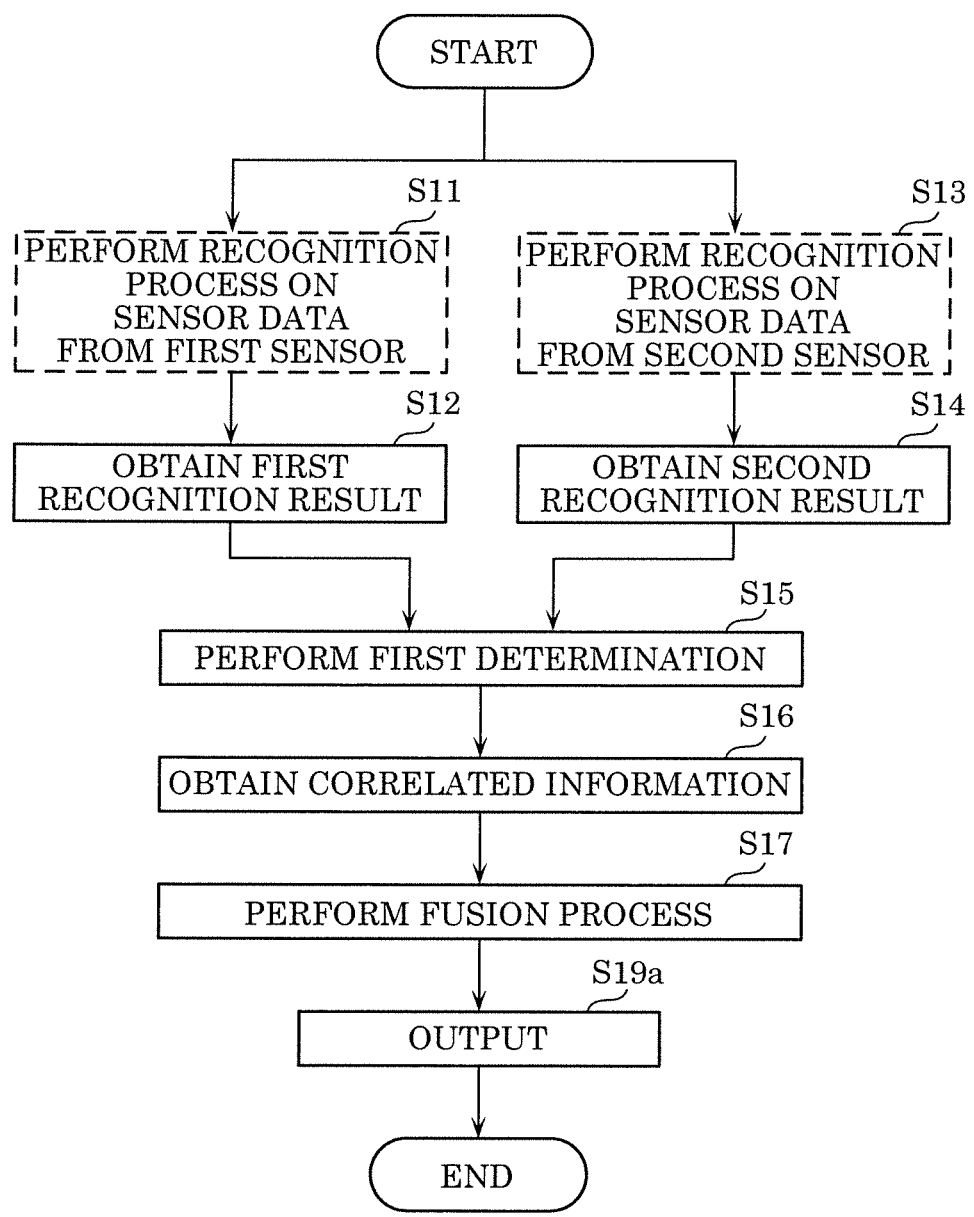
FIG. 8 is a flow chart illustrating one example of an information processing method performed in the information processing system according to Embodiment 2.

FIG. 8 is a flow chart illustrating one example of an information processing method performed in the information processing system according to Embodiment 2.

The information processing method according to Embodiment 2 differs from the information processing method according to Embodiment 1 in that step S18 is not performed and the output step S19a is different. Accordingly, the following description will focus on step S19a.

After step S17, outputter 180a outputs at least one of the first recognition result, the second recognition result, and the third recognition result, in accordance with the first correlation information and the second correlation information (S19a).

Even when second determination is not performed, such as is the case in Embodiment 2, information processing system 10A selects a recognition result to output in accordance with the result of the first determination, the first correlation information, and the second correlation information. More specifically, when one of the accuracies of the first recognition result and the second recognition result is estimated to be high in accordance with the first correlation information and the second correlation information, and the degree of similarity between the first recognition result and the second recognition result is low, information processing system 10A does not output the third recognition result. Accordingly, it is possible to inhibit a degradation in object recognition results caused by the fusion of recognition results.

Embodiment 3

Next, Embodiment 3 will be described.

Figure 9:
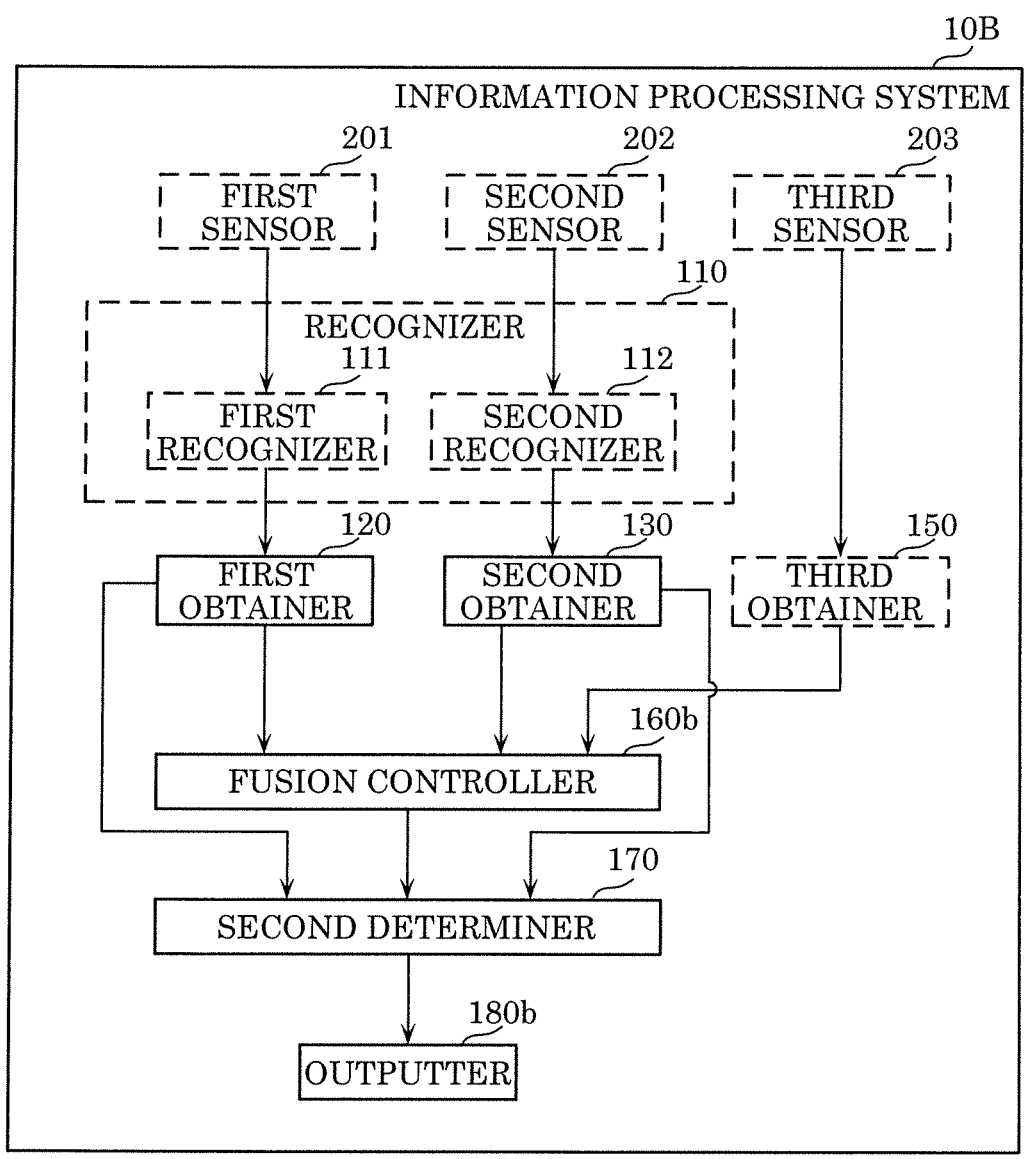
FIG. 9 is a block diagram illustrating one example of the functional configuration of the information processing system according to Embodiment 3.

FIG. 9 is a block diagram illustrating one example of the functional configuration of the information processing system according to Embodiment 3.

Information processing system 10B differs from information processing system 10 according to Embodiment 1 in that it does not include first determiner 140, and the functions of fusion controller 160b and outputter 180b are different. Other configurations in information processing system 10B are the same as information processing system 10 according to Embodiment 1. Accordingly, repeated description thereof will be omitted.

Fusion controller 160b obtains the first recognition result and the second recognition result from recognizer 110, and performs the fusion process of fusing the obtained first and second recognition results. In other words, fusion controller 160b according to Embodiment 2 differs from fusion controller 160 according to Embodiment 1 in that it performs the fusion process of fusing the first and second recognition results without taking into consideration the result of the first determination.

When the accuracies of the first recognition result and the second recognition result are estimated to be high in accordance with the first correlation information and the second correlation information, outputter 180b may output at least the third recognition result among the first recognition result, the second recognition result, and the third recognition result.

When one of the accuracies of the first recognition result and the second recognition result is estimated to be high in accordance with the first correlation information and the second correlation information, and the degrees of similarity between third recognition result and the first and second recognition results are high, outputter 180b may output at least the third recognition result among the first recognition result, the second recognition result, and the third recognition result. On the other hand, when one of the accuracies of the first recognition result and the second recognition result is estimated to be high in accordance with the first correlation information and the second correlation information, and the degrees of similarity between third recognition result and the first and second recognition results are low, outputter 180b need not output the third recognition result. Note that when at least the third recognition result among the first recognition result, the second recognition result, and the third recognition result is output when one of the accuracies of the first recognition result and the second recognition result is estimated to be high in accordance with the first correlation information and the second correlation information, outputter 180*b* may also output, along with the third recognition result, a recognition result estimated to be high in accuracy among the first recognition result and the second recognition result.

When one of the accuracies of the first recognition result and the second recognition result is estimated to be low in accordance with the first correlation information and the second correlation information, outputter 180*b* may output at least one of the first recognition result and the second recognition result.

FIG. 10 is a table illustrating whether or not the third recognition result improves in performance in a plurality of cases depending on degree of similarity and recognition accuracy. FIG. 10 divides the results based on whether the degree of similarities between the third recognition result and the first and second recognition results are both high or not, whether the recognition accuracy of the first recognition result is high or low, and whether the recognition accuracy of the second recognition result is high or low. In Embodiment 3, since the first determination is not performed, in FIG. 10, whether the degree of similarity between the first recognition result and the second recognition result is high or low, as illustrated in FIG. 4, is not taken into consideration.

Accordingly, in the cases illustrated in FIG. 10, when the recognition accuracy combination is "high/low", under "high degree of similarity with third recognition result", the performance of the third recognition result increases, but under "low degree of similarity with third recognition result", the performance of the third recognition result decreases. In cases in which the recognition accuracy is "high/high" and "low/low", the results are the same as illustrated in FIG. 4, so repeated description will be omitted.

Figure 11:
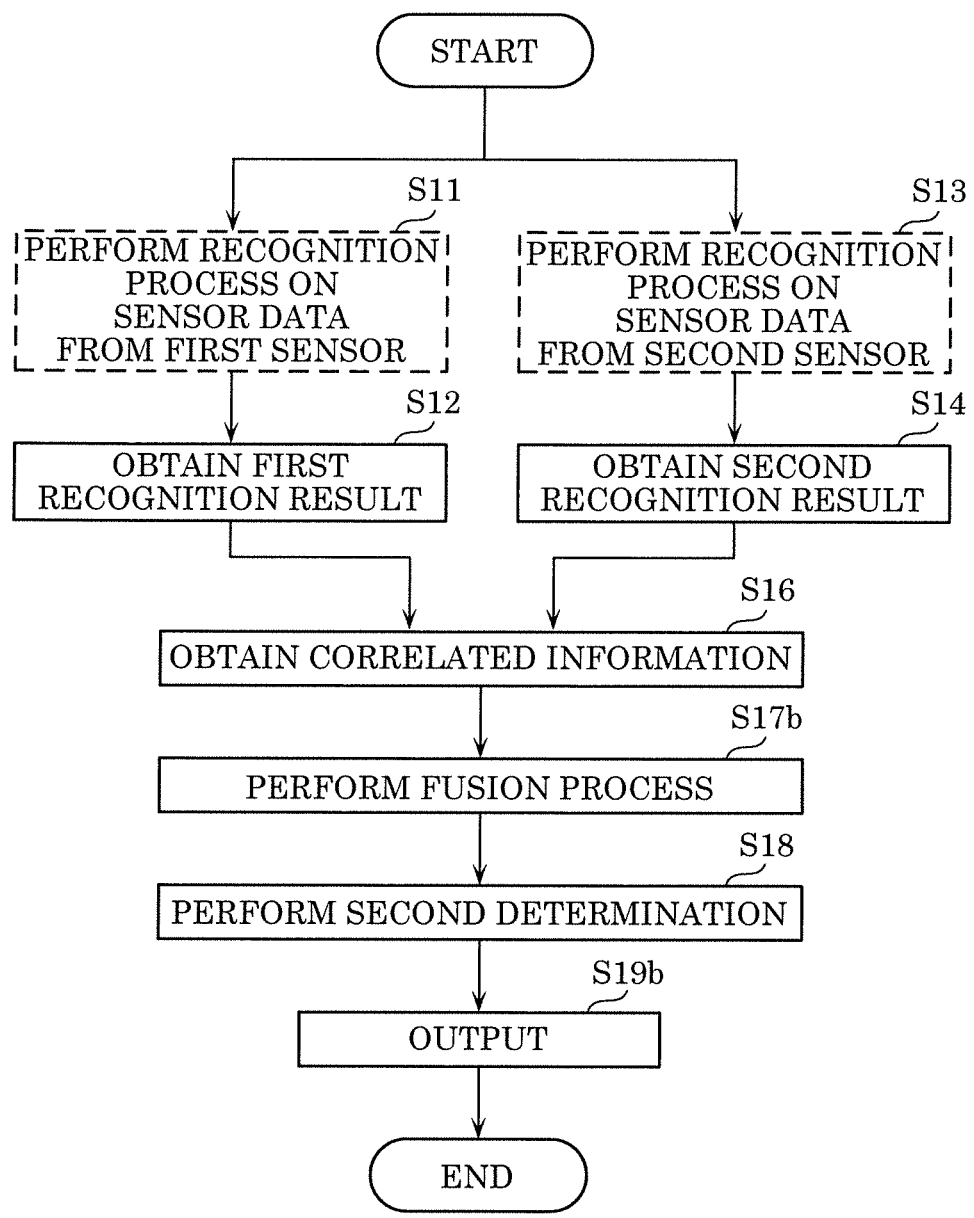
FIG. 11 is a flow chart illustrating one example of an information processing method performed in the information processing system according to Embodiment 3.

FIG. 11 is a flow chart illustrating one example of an information processing method performed in the information processing system according to Embodiment 3.

The information processing method according to Embodiment 3 differs from the information processing method according to Embodiment 1 in that step S15 is not performed and the fusion process step S17*b* is different. Accordingly, the following description will focus on step S17*b*.

After step S16, fusion controller 160*b* performs the fusion process of fusing the first recognition result and the second recognition result (S17*b*).

Thereafter, step S18 is performed, and after step S18, outputter 180*b* outputs at least one of the first recognition result, the second recognition result, and the third recognition result, in accordance with the result of the second determination (S19*b*).

Even when the first determination is not performed, such as is the case in Embodiment 3, information processing system 10B selects a recognition result to output in accordance with the result of the second determination, the first correlation information, and the second correlation information. More specifically, when one of the accuracies of the first recognition result and the second recognition result is estimated to be high in accordance with the first correlation information and the second correlation information, and the first and second degrees of similarities between the third recognition result and the first and second recognition results are low, information processing system 10B does not output the third recognition result. Accordingly, it is possible to inhibit a degradation in object recognition results caused by the fusion of recognition results.

Other Embodiments

Although each of information processing systems 10, 10A, and 10B is exemplified in Embodiments 1 through 3 described above as an information processing system that is, but not limited to being, provided in vehicle 200, the information processing system is applicable to any information processing system configured to perform a fusion process of fusing two or more types of recognition results based on sensor data from two or more sensors.

Moreover, information processing systems 10, 10A, and 10B according to Embodiments 1 through 3 described above are described as, but not limited to, outputting recognition results of a recognition process based on sensor data. For example, a pairing of data in cases where the third recognition result is output, that is to say, where a third recognition result determined to improve performance can be obtained and data associated with the corresponding sensor data may be used as machine learning data, and a pairing of data in cases where a third recognition result determined to reduce performance can be obtained and data associated with the corresponding sensor data may be used as machine learning data.

Moreover, for example, in cases where the third recognition result is output, that is to say, where a third recognition result determined to improve performance can be obtained, said third recognition result may be used to append an annotation. Appending an annotation is, for example, when the recognition result is from an image, placing, for each type of object or for a specific type of object, a bracket, such as a frame around object, indicating the size or location of the object in the image.

Note that in each of the above embodiments, components may be implemented as dedicated hardware or by executing a software program appropriate for each component. Each component may be realized as a result of a program execution unit of a CPU or processor or the like loading and executing a software program stored in a storage medium such as a hard disk or a semiconductor memory chip. Here, the software that implements, for example, the information processing method according to the above embodiments, is the following type of program.

The program causes a computer to execute an information processing method including: obtaining a first recognition result which is a recognition result of an object based on sensor data from a first sensor; obtaining a second recognition result which is a recognition result of an object based on sensor data from a second sensor different from the first sensor; performing a first determination of determining a degree of similarity between the first recognition result and the second recognition result; controlling, in accordance with a result of the first determination, a fusion process of fusing the first recognition result and the second recognition result; and outputting at least one of the first recognition result, the second recognition result, and a third recognition result, in accordance with the result of the first determination. The third recognition result is a fusion of the first recognition result and the second recognition result.

Alternatively, the program may cause a computer to execute an information processing method including: obtaining a first recognition result which is a recognition result of an object based on sensor data from a first sensor; obtaining a second recognition result which is a recognition result of an object based on sensor data from a second sensor different from the first sensor; performing a fusion process of fusing the first recognition result and the second recognition result; performing a second determination of determining a first degree of similarity between a third recognition result and the first recognition result and a second degree of similarity between the third recognition result and the second recognition result, the third recognition result being a fusion of the first recognition result and the second recognition result; and outputting at least one of the first recognition result, the second recognition result, and the third recognition result, in accordance with a result of the second determination.

Hereinbefore, an information processing system and an information processing method according to one or more aspects of the present disclosure have been described based on exemplary embodiments, but the present disclosure is not limited to the above exemplary embodiments. Those skilled in the art will readily appreciate that many modifications are possible in the exemplary embodiments without materially departing from the novel teachings and advantages of the present disclosure. Accordingly, all such modifications are intended to be included within one or more aspects of the present disclosure.

INDUSTRIAL APPLICABILITY

The present disclosure is applicable as an information processing system, an information processing method, etc., that are capable of inhibiting a degradation of object recognition results caused by fusing the recognition results.

What is claimed is:

1. An information processing system configured to:
   obtain a first recognition result which is a recognition result of an object based on sensor data from a first sensor;
   obtain a second recognition result which is a recognition result of an object based on sensor data from a second sensor different from the first sensor;
   obtain first correlation information correlated to a first recognition accuracy of the first recognition result and second correlation information correlated to a second recognition accuracy of the second recognition result;
   perform a first determination of determining a degree of similarity between recognition content of the first recognition result and recognition content of the second recognition result;
   control a fusion process of fusing the first recognition result and the second recognition result, in accordance with a result of the first determination, the first correlation information obtained, and the second correlation information obtained; and
   output at least one of the first recognition result, the second recognition result, and a third recognition result, in accordance with the result of the first determination, the third recognition result being a fusion of the first recognition result and the second recognition result.

2. The information processing system according to claim 1, wherein
   the recognition content of the first recognition result and the recognition content of the second recognition result are locations of the objects, and
   the degree of similarity is a degree of similarity relating to the locations of the objects.

3. The information processing system according to claim 1, wherein
   the recognition content of the first recognition result and the recognition content of the second recognition result are classifications of the objects, and
   the degree of similarity is a degree of similarity between the classifications of the objects.

4. The information processing system according to claim 1, wherein
   the recognition content of the first recognition result and the recognition content of the second recognition result are detections of the objects, and
   the degree of similarity is a degree of similarity between total numbers of the objects detected.

5. The information processing system according to claim 1, wherein
   the first correlation information and the second correlation information each indicate at least one of: (i) an environment of each space in which the first sensor and the second sensor are located when the first sensor and the second sensor are each performing sensing operations; (ii) a state of each of the first sensor and the second sensor when the first sensor and the second sensor are each performing sensing operations; and (iii) specifications of each of the first sensor and the second sensor.

6. The information processing system according to claim 1, further configured to:
   perform a second determination of determining a first degree of similarity between the third recognition result and the first recognition result and a second degree of similarity between the third recognition result and the second recognition result; and
   output at least one of the first recognition result, the second recognition result, and the third recognition result, in accordance with a result of the second determination.

7. The information processing system according to claim 1, wherein
   the information processing system controls the fusion process by controlling whether to execute the fusion process.

8. The information processing system according to claim 7, wherein
   the information processing system controls whether to execute the fusion process by controlling whether to input the first recognition result and the second recognition result into a fusion processor that performs the fusion process.

9. The information processing system according to claim 1, wherein
   the information processing system controls the fusion process by adjusting a parameter of the fusion process.

10. The information processing system according to claim 1, further configured to:
    execute a recognition process for recognizing an object based on the sensor data from the first sensor and the sensor data from the second sensor, and output the first recognition result and the second recognition result.

11. An information processing system, configured to:
    obtain a first recognition result which is a recognition results of an object based on sensor data from a first sensor;
    obtain a second recognition result which is a recognition result of an object based on sensor data from a second sensor different from the first sensor;
    perform a fusion process of obtaining a third recognition result by fusing the first recognition result and the second recognition result, the third recognition result being a fusion of the first recognition result and the second recognition result;
    perform a second determination of determining a first degree of similarity between the third recognition result and the first recognition result and a second degree of similarity between the third recognition result and the second recognition result; and output at least one of the first recognition result, the second recognition result, and the third recognition result, in accordance with a result of the second determination.

12. An information processing method, comprising:

obtaining a first recognition result which is a recognition result of an object based on sensor data from a first sensor;

obtaining a second recognition result which is a recognition result of an object based on sensor data from a second sensor different from the first sensor;

obtaining first correlation information correlated to a first recognition accuracy of the first recognition result and second correlation information correlated to a second recognition accuracy of the second recognition result;

performing a first determination of determining a degree of similarity between recognition content of the first recognition result and recognition content of the second recognition result;

controlling a fusion process of fusing the first recognition result and the second recognition result, in accordance with a result of the first determination, the first correlation information obtained, and the second correlation information obtained; and outputting at least one of the first recognition result, the second recognition result, and a third recognition result, in accordance with the result of the first determination, the third recognition result being a fusion of the first recognition result and the second recognition result.

13. An information processing method, comprising:

obtaining a first recognition result which is a recognition result of an object based on sensor data from a first sensor;

obtaining a second recognition result which is a recognition result of an object based on sensor data from a second sensor different from the first sensor;

performing a fusion process of obtaining a third recognition result by fusing the first recognition result and the second recognition result, the third recognition result being a fusion of the first recognition result and the second recognition result;

performing a second determination of determining a first degree of similarity between the third recognition result and the first recognition result and a second degree of similarity between the third recognition result and the second recognition result; and outputting at least one of the first recognition result, the second recognition result, and the third recognition result, in accordance with a result of the second determination.

* * * * *